(12) United States Patent
Bi

(10) Patent No.: US 11,886,735 B2
(45) Date of Patent: Jan. 30, 2024

(54) DATA MOVEMENT BASED ON ADDRESS TABLE ACTIVITY

(71) Applicant: Micron Technology, Inc., Boise, ID (US)

(72) Inventor: Yanhua Bi, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 23 days.

(21) Appl. No.: 17/701,476

(22) Filed: Mar. 22, 2022

(65) Prior Publication Data

US 2023/0305738 A1     Sep. 28, 2023

(51) Int. Cl.
*G06F 3/06*     (2006.01)
*G06F 12/10*     (2016.01)

(52) U.S. Cl.
CPC .......... *G06F 3/0655* (2013.01); *G06F 3/0604* (2013.01); *G06F 3/0679* (2013.01); *G06F 12/10* (2013.01)

(58) Field of Classification Search
CPC .... G06F 3/0655; G06F 3/0604; G06F 3/0679; G06F 12/10
See application file for complete search history.

(56) References Cited

U.S. PATENT DOCUMENTS

| | | | | |
|---|---|---|---|---|
| 7,610,437 B2 * | 10/2009 | Sinclair | ................ | G06F 3/0652 711/104 |
| 7,984,084 B2 * | 7/2011 | Sinclair | ............... | G06F 16/1847 707/818 |
| 8,285,918 B2 * | 10/2012 | Maheshwari | ........ | G11C 7/1072 711/159 |
| 8,443,263 B2 * | 5/2013 | Selinger | .............. | G06F 11/1068 714/768 |
| 8,873,284 B2 * | 10/2014 | Sinclair | ............... | G06F 12/0246 365/185.11 |
| 9,223,693 B2 * | 12/2015 | Sinclair | ............... | G06F 12/0246 |
| 9,336,133 B2 * | 5/2016 | Sinclair | ............... | G06F 12/0246 |
| 9,348,746 B2 * | 5/2016 | Sinclair | ............... | G06F 12/0246 |
| 9,465,731 B2 * | 10/2016 | Sinclair | ............... | G06F 12/0246 |
| 9,734,050 B2 * | 8/2017 | Sinclair | ............... | G06F 12/0253 |
| 9,734,911 B2 * | 8/2017 | Sinclair | ................. | G06F 3/0658 |
| 9,778,855 B2 * | 10/2017 | Sinclair | ................... | G06F 3/064 |
| 10,108,543 B1 * | 10/2018 | Duggal | .................. | G06F 11/14 |
| 10,108,544 B1 * | 10/2018 | Duggal | .................. | G06F 11/14 |
| 10,120,613 B2 * | 11/2018 | Sinclair | ................... | G06F 12/02 |
| 10,133,490 B2 * | 11/2018 | Sinclair | ................ | G06F 3/0655 |
| 10,255,179 B2 * | 4/2019 | Ji | ......................... | G06F 3/0659 |
| 10,430,279 B1 * | 10/2019 | Dittia | .................... | G06F 3/0656 |
| 10,795,812 B1 * | 10/2020 | Duggal | .................. | G06F 3/067 |
| 10,983,715 B2 * | 4/2021 | Sharoni | ............... | G06Q 20/105 |
| 11,086,537 B2 * | 8/2021 | Byun | .................... | G06F 3/0679 |

(Continued)

FOREIGN PATENT DOCUMENTS

JP     7020989 B2 *    2/2022          G06F 11/1048

*Primary Examiner* — Christopher D Birkhimer
(74) *Attorney, Agent, or Firm* — Holland & Hart LLP

(57) ABSTRACT

Methods, systems, and devices for data movement based on address table activity are described. A memory system may support a first type of data movement operation and a second type of data movement operation. The memory system may select between the first type of data movement operation and the second type of data movement operation for a region based on address table activity for the region.

25 Claims, 8 Drawing Sheets

(56) References Cited

U.S. PATENT DOCUMENTS

| | | | |
|---|---|---|---|
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0189477 A1* | 8/2008 | Asano | G06F 12/0246 |
| | | | 711/E12.008 |
| 2011/0145473 A1* | 6/2011 | Maheshwari | G06F 12/12 |
| | | | 711/E12.008 |
| 2011/0161784 A1* | 6/2011 | Selinger | G06F 11/1016 |
| | | | 714/E11.002 |
| 2014/0006688 A1* | 1/2014 | Yu | G06F 12/0246 |
| | | | 365/185.03 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0227602 A1* | 8/2015 | Ramu | G06F 11/1456 |
| | | | 707/634 |
| 2016/0179392 A1* | 6/2016 | Suto | G06F 3/0632 |
| | | | 711/103 |
| 2016/0246713 A1* | 8/2016 | Choi | G06F 3/0608 |
| 2017/0075593 A1* | 3/2017 | Kim | G06F 3/0653 |
| 2017/0123655 A1* | 5/2017 | Sinclair | G06F 3/061 |
| 2018/0189175 A1* | 7/2018 | Ji | G06F 3/0679 |
| 2020/0045036 A1* | 2/2020 | Lee | H04L 63/083 |
| 2020/0089420 A1* | 3/2020 | Sharoni | G06Q 20/354 |
| 2020/0192794 A1* | 6/2020 | Lee | G06F 12/0246 |
| 2020/0310686 A1* | 10/2020 | Truong | G06F 3/061 |
| 2021/0248063 A1* | 8/2021 | Basu | G06F 3/0659 |
| 2021/0326067 A1* | 10/2021 | Li | G06F 3/0679 |
| 2021/0342362 A1* | 11/2021 | Haravu | G06F 11/1464 |

\* cited by examiner

DATA MOVEMENT BASED ON ADDRESS TABLE ACTIVITY

FIELD OF TECHNOLOGY

The following relates to one or more systems for memory, including data movement based on address table activity.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
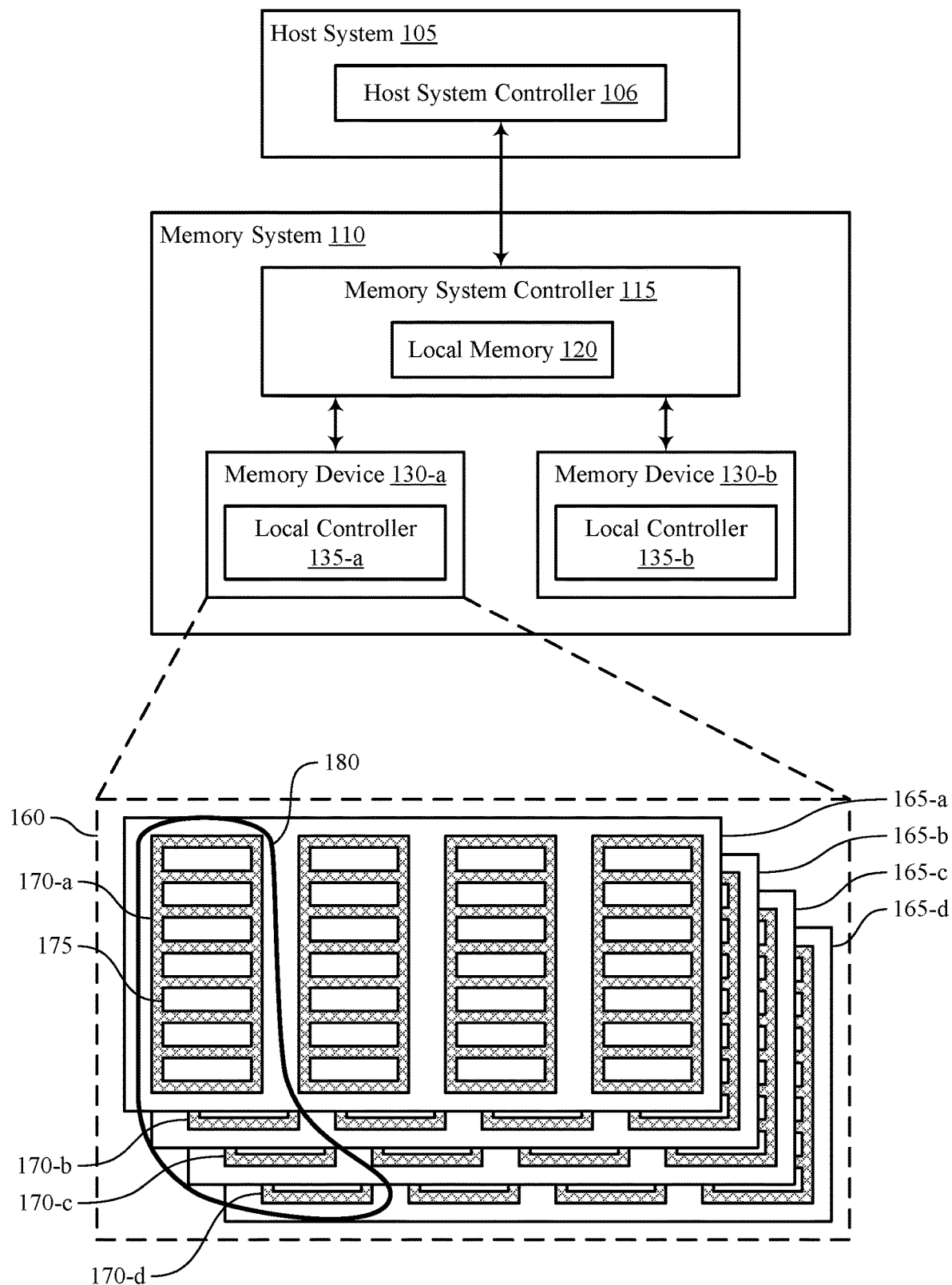
FIG. 1 illustrates an example of a system that supports data movement based on address table activity in accordance with examples as disclosed herein.

A memory system may implement data movement operations, such as garbage collection operations, in which data stored across pages of a memory block of memory is consolidated and written to free pages of another memory block. In some examples, a memory system may support different types of data movement operations. For example, the memory system may support a first type of data movement operation in which data is written to pages that have random (e.g., non-sequentially indexed) physical addresses and may support a second type of data movement operation in which data is written to pages that have sequentially indexed physical addresses. Writing data to pages that have sequentially indexed physical addresses may improve access operations (e.g., read operations) for the data, but the second type of data movement operation may take longer and have increased complexity relative to the first type of data movement operation. So, indiscriminately performing the second type of data movement may decrease system performance overall.

According to the techniques described herein, a memory system may improve performance by performing the second type of data movement operation for regions of a logical-to-physical (L2P) address table (which may also be referred to as a logical-to-physical address mapping) that satisfy certain conditions. For example, the memory system may maintain counters for a region of the L2P table and, if the counters indicate that the region is frequently read (e.g., is read a threshold amount of times within a threshold period of time), the memory system may perform the second type of data movement operation for data associated with the region. If the counters indicate that the region is infrequently accessed (e.g., is accessed less than a threshold amount of times within a threshold period of time) or frequently written (e.g., is written a threshold amount of times within a threshold period of time), the memory system may perform the first type of data movement operation. By discretionarily performing the second type of data movement operation, the memory system may avoid performing the second type of data movement operation on regions whose costs associated with performing the second type of data movement operation outweigh the benefits of having data written to sequentially indexed physical addresses.

In some systems, a memory system may include a memory device that has partitions with different types of memory cells. For example, a memory device may include a first partition with memory cells that are configured to support a first quantity of levels (e.g., one level, such a write booster buffer) and a second partition with memory cells that are configured to support a second quantity of levels (e.g., two or more levels). As an illustration, the first partition may include single-level memory cells (SLCs) that are configured to store one bit of information and the second partition may include multiple level memory cells that are configured to store two or more bits. In a write boost mode, the memory system may initially write data to the first partition and then (e.g., upon a trigger condition) may transfer the data from the first partition to the second partition. But in some cases, the memory system may (e.g., in response to the trigger condition) transfer the data to the second partition before the data is ready, which may negatively impact system performance.

According to the techniques described herein, a memory system may improve performance by using the write frequency of a first partition to determine a timing for transferring data from the first partition to a second partition. For example, the memory system may determine whether the first partition has been written to a threshold amount of times within a threshold period of time, and, if so, may delay transferring data in the first partition to the second partition.

Figure 2:
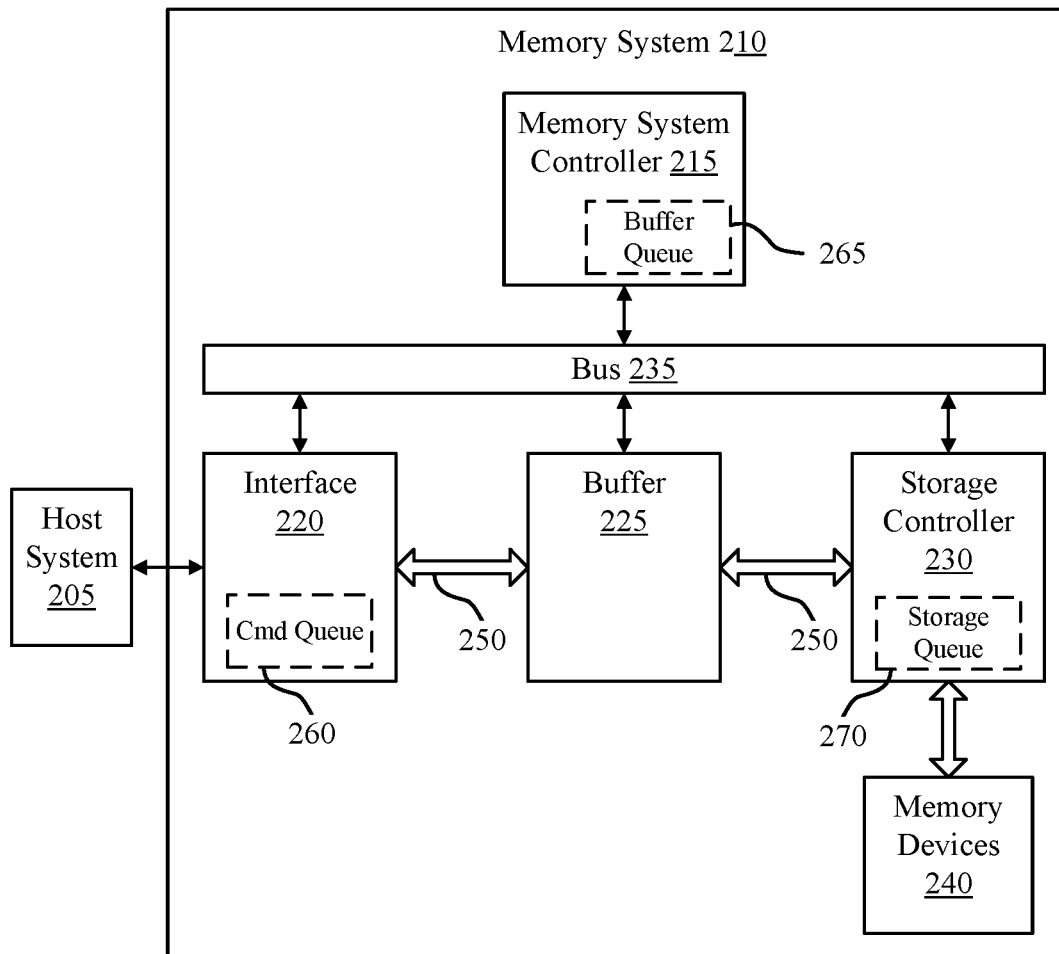
FIG. 2 illustrates an example of a system that supports data movement based on address table activity in accordance with examples as disclosed herein.

Features of the disclosure are initially described in the context of systems, devices, and circuits with reference to FIGS. 1 through 2. Features of the disclosure are described in the context of a memory system and process flows with reference to FIGS. 3-5. These and other features of the disclosure are further illustrated by and described in the context of an apparatus diagram and flowchart that relate to data movement based on address table activity with reference to FIGS. 6-8.

FIG. 1 illustrates an example of a system 100 that supports data movement based on address table activity in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support data movement based on address table activity. For example, the host system 105, the memory system controller 115, or a memory device 130 (e.g., a local controller 135) may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

As noted, the memory system 110 may perform data movement operations, such as garbage collection operations, to consolidate valid data and free up blocks for writing. As part of a data movement operation, the memory system 110 may read data (e.g., valid data) from one or more origin blocks and write the data to one or more target blocks. The data may be associated with a region (e.g., a set of logical addresses) of an L2P table. So, the memory system 110 may update the physical addresses mapped to the region from those corresponding to the origin block(s) to those corresponding to the target block(s). In some examples, a physical address may refer to a physical page address (PPA).

The memory system 110 may support a first type of data movement operation and a second type of data movement operation, among other types. For example, the first type of data movement operation may transfer data from a source block to a target block without reorganizing the addresses of the source block. The second type of data movement operation may transfer data from a source block to a target block and reorganize the addresses of the source index to be sequentially-indexed in the target block. The first type of data movement operation may write data to memory cells with non-sequentially indexed physical addresses and may have a shorter latency than the second type of data movement operation, which may write data to memory cells with sequentially indexed physical addresses. In a system where sequentially indexed physical addresses are separated by x (e.g., x=1), a set of physical address may be non-sequentially indexed if the difference between a physical address and the next highest (or the next lowest) physical address in the set is more than x. To illustrate, if x=1, the following set of physical addresses may be considered non-sequentially indexed because the difference between 4 and 7 is more than one: (2, 3, 4, 7, 8, 9). In a system where sequentially indexed physical addresses are separated by x (e.g., x=1), a set of physical address may be considered sequentially indexed if the difference between a physical address and the next highest (or the next lowest) physical address in the set is equal to x. To illustrate, if x=1, the following set of physical addresses may be considered sequentially indexed because the difference any two sequential physical addresses is equal to one: (2, 3, 4, 5, 6, 7, 8, 9).

Writing data to sequentially indexed physical addresses, as occurs in the second type of data movement operation, may allow the memory system 110 to reduce (e.g., compress) the size of the region (and thus the L2P table), which in turn may reduce latency associated with accessing the region (e.g., loading the region into a volatile memory during an access operation), among other benefits. For instance, rather than storing the physical address mapped to each logical address in a given region, the memory system 110 may store the first physical address and an indicator that the other physical addresses for the region are sequentially indexed. But the second type of data movement operation may take longer than the first type of data movement operation, among other disadvantages.

According to the techniques described herein, the memory system 110 may selectively perform the first type of data movement operation for regions of the L2P table that are infrequently accessed (or frequently written) and may perform the second type of data movement operation for regions of the L2P table that are frequently read.

By selectively performing the first type of data movement operation on regions that are infrequently accessed the memory system 110 may avoid the cost of the second type of data movement operation, which may outweigh the benefits for the infrequently accessed region. By selectively performing the first type of data movement operation on regions that are frequently written, the memory system 110 may avoid the cost of the second type of data movement operation, the benefits of which may be short-lived due to the region be re-written shortly thereafter. By selectively performing the second type of data movement operation on regions that are frequently read (but may not be frequently written to), the memory system 110 may benefit from the advantages of the second type of data movement operation, which may outweigh the costs of the second type of data movement operation for frequently read regions. Thus, the memory system 110 may select between the first type and the second type of data movement operations based on L2P table activity for a region.

FIG. 2 illustrates an example of a system 200 that supports data movement based on address table activity in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, if the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

To facilitate memory access operations (e.g., read operations, write operations), the memory system 210 may "load" one or more regions of an L2P table into a volatile memory device (e.g., the buffer 225) in response to an access command from the host system 205. As previously noted, a region of an L2P table may include a set of logical addresses and an indication of the mapping between the set of logical addresses and corresponding physical addresses. Loading a region of an L2P table may refer to reading the region of the L2P table from a non-volatile memory device (e.g., a memory device 240) and writing the region to the volatile memory device. If the memory access operation is a write operation, the memory system 210 may update the region of the L2P table (e.g., map one or more logical addresses to new physical addresses) in the volatile memory device and "flash" the updated region, or at least the updated portion of the region, back to the non-volatile memory device. Flashing a region (or an updated portion of a region) may refer to reading the region (or the updated portion of the region) from the volatile memory device and writing the region (or the updated portion of the region) to the non-volatile memory device. According to the techniques described herein, the memory system 210 may maintain a load counter and a flash counter for each region of the L2P table and may use the counters to select between the first type of data movement operation and the second type of data movement operation for the regions.

In some examples, the memory system 210 may include high density memory cells (e.g., MLCs) and low density memory cells (e.g., SLCs). High density memory cells may be capable of storing more data than low density memory cells (because the high density memory cells may use more levels than the low density memory cells) but may be less reliable than low density memory cells (because the difference between levels of high density memory cells may be smaller, and therefore more impacted by small variations, relative to low density memory cells). Examples of MLCs include bi-level memory cells (BLCs), which may be configured to store two bits of information, tri-level memory cells (TLCs), which may be configured to store three bits of information, and quad-level memory cells (QLCs), which may be configured to store four bits of information.

In some examples, the memory system 210 may operate in a write boost mode, which may allow the memory system 210 to benefit from high-density memory cells (e.g., MLCs) without sacrificing the reliability of low-density memory cells (e.g., SLCs). In the write boost mode, the memory system 210 may repeatedly write data to a first partition (e.g., a partition with SLCs, which may be referred to as a write booster buffer) until the memory system 210 confirms (e.g., by reading the data and performing error analysis) that the data is correctly stored in the first partition. At some point, the memory system 210 may transfer the data from the first partition to the second partition (e.g., to reduce the quantity of memory cells consumed by the data). According to the techniques described herein, the memory system 210 may avoid transferring the data from the first partition to the second partition prematurely (e.g., before the data is correctly stored in the first partition) by using a flash counter as a basis for timing the transfer.

Figure 3:
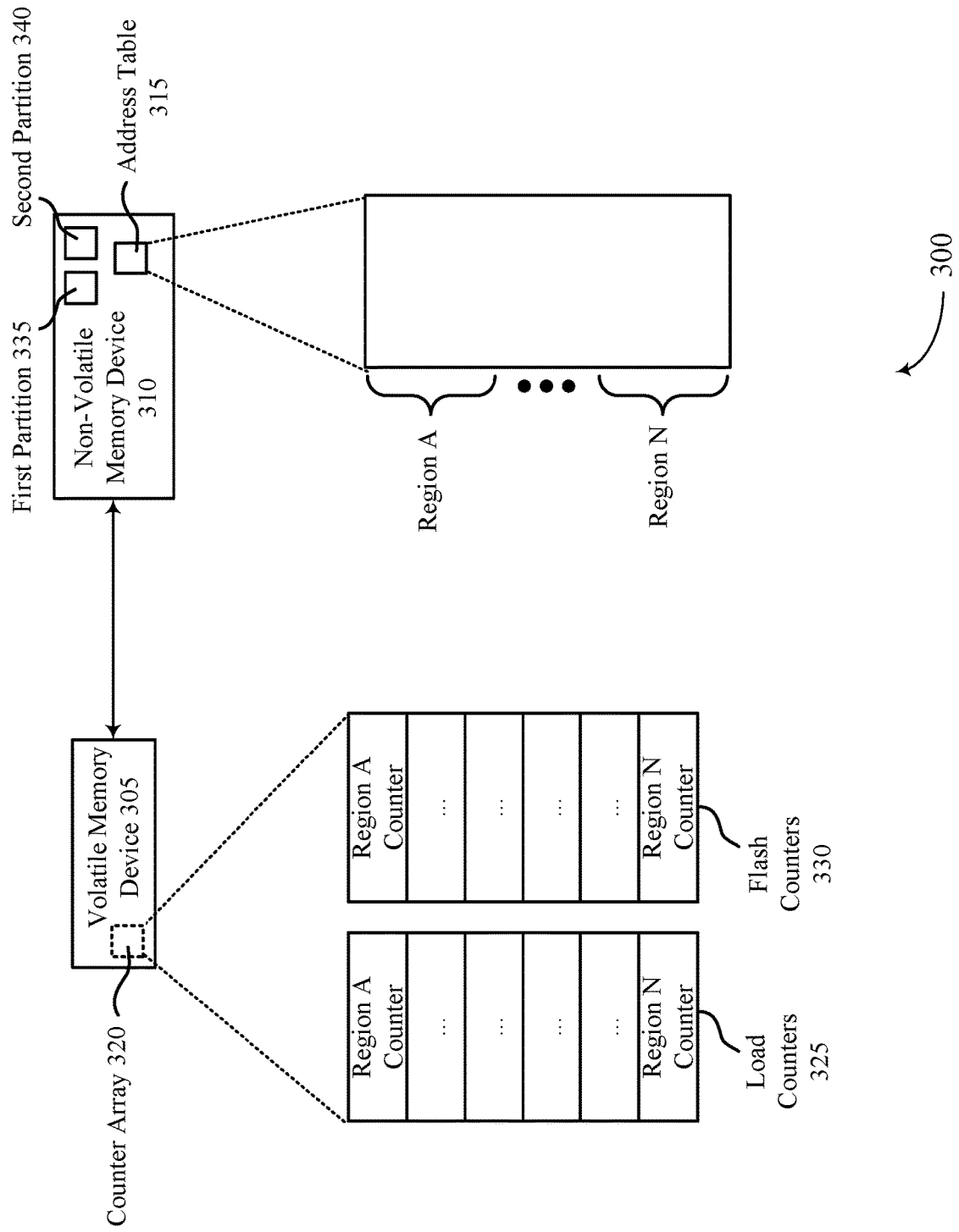
FIG. 3 illustrates an example of a memory system that supports data movement based on address table activity in accordance with examples as disclosed herein.

FIG. 3 illustrates an example of a memory system 300 that supports data movement based on address table activity in accordance with examples as disclosed herein. The memory system 300 may include a volatile memory device 305 and a non-volatile memory device 310. In some examples, the volatile memory device 305 may be an example of a SRAM device and the non-volatile memory device 310 may be an example of a NAND memory device. In some examples, the volatile memory device 305 may be an example of a buffer 225 as described with reference to FIG. 2 and the non-volatile memory device 310 may be an example of a memory device 240 as described with reference to FIG. 2. The memory system 300 may maintain counters for regions of an L2P table and may use the counters to select between types of data movement operations (e.g., garbage collection operations) supported by the memory system 300.

The non-volatile memory device 310 may be configured to store an address table 315, which may also be referred to as an L2P table or a logical-to-physical address mapping. The address table 315 may include sets of logical addresses grouped into regions A through N. The address table 315 may also include indications of the mappings between logical addresses and corresponding physical addresses. If the data associated with a region of the address table 315 is stored in memory cells with non-sequentially indexed physical addresses (e.g., sequentially-indexed logical addresses are mapped to non-sequentially indexed physical addresses), the address table 315 may include each physical address mapped to the region. If the data associated with a region of the address table 315 is stored in memory cells with sequentially indexed physical addresses (e.g., as may be the case after performing the second type of data movement operation), the address table 315 may include the numerically first physical address mapped to the region and an indication that the physical addresses mapped to the region are sequentially indexed. So, regions with sequentially indexed physical addresses may consume less space in the non-volatile memory device 310 (and thus may be loaded faster) relative to regions with non-sequentially indexed physical addresses.

The memory system 300 may maintain a counter array 320 for the address table 315. For example, the memory system 300 may maintain the counter array 320 in the volatile memory device 305. However, other storage locations for the counter array 320, including the non-volatile memory device 310, are contemplated and within the scope of the present disclosure. The counter array 320 may include load counters 325 for the regions of the address table 315 and flash counters 330 for the regions of the address table 315. For example, the counter array 320 may include a respective load counter and flash counter for each region A through N of the address table 315.

The memory system 300 may increment the load counter for a region if the memory system 300 determines that the region of the address table 315 has been transferred from the non-volatile memory device 310 to the volatile memory device 305, which may occur in response to a memory access operation (e.g., a read operation, a write operation) that targets the logical addresses in the region. The memory system 300 may reset the load counter after a threshold amount of time. So, the load counter for a region may indicate the access frequency for the region, where the access frequency refers to the quantity of memory access operations that occur for the region within the threshold amount of time.

The memory system 300 may increment the flash counter for a region if the memory system 300 determines that the region of the address table 315 has been modified while in the volatile memory device 305 transferred from the volatile memory device 305 to the non-volatile memory device 310 (which may occur in response to a write operation that targets the logical addresses in the region). The memory system 300 may reset the flash counter after a threshold amount of time, which may be equal to and coincide with the threshold amount of time for resetting the load counter for the region. So, the flash counter for a region may indicate the write frequency for the region, where the write frequency refers to the quantity of write operations that occur for the region within the threshold amount of time.

The memory system 300 may use the load counter and the flash counter of a region to determine the read frequency for the region, where the read frequency refers to the quantity of read operations that occur for the region within the threshold amount of time. For example, the memory system 300 may determine that the read frequency for a region by subtracting the value of the flash counter for the region (which indicates the quantity of write operations for the region) from the value of the load counter for the region (which indicates the total quantity of memory access operations for the region).

The memory system 300 may use the counters for a region to determine the type of data movement operation to perform for the data associated with the region. For example, if the counters indicate that the region is infrequently accessed (e.g., if the load counter value is less than a threshold value) or is frequently written (e.g., if the flash counter value is greater than a threshold value), the memory system 300 may select and perform the first type of data movement operation for the data associated with the region. If the counters indicate that the region is frequently read (e.g., if the load counter value is greater than a first threshold value and the flash counter is less than a second threshold value), the memory system 300 may select and perform the second type of data movement operation for the data associated with the region.

Thus, the memory system 300 may use the counters to selectively perform the second type of data movement operation, which may improve system performance. In some examples, the memory system 300 may add one or more additional conditions for performing the second type of data movement operation. For example, the memory system 300 may determine how many of the physical addresses mapped to a set of logical addresses are non-sequentially indexed. If the quantity (or percentage) of non-sequentially indexed physical addresses is greater than a threshold, the memory system 300 may perform the second type of data movement operation. If the quantity (or percentage) of non-sequentially indexed physical addresses is less than a threshold, the memory system 300 may perform the first type of data movement operation. Alternatively, the memory system 300 may compare the ratio of sequentially indexed physical addresses to non-sequentially indexed physical addresses to a threshold ratio.

In some examples, the non-volatile memory device 310 may include multiple partitions. For example, the non-volatile memory device 310 may include a first partition 335 that includes memory cells that are configured to support a first quantity of levels. For instance, the first partition 335 may include SLCs. In some examples, the first partition 335 may be referred to as a write booster buffer. The non-volatile memory device 310 may also include a second partition 340 that includes memory cells that are configured to support a second quantity of levels. For instance, the second partition 340 may include MLCs (e.g., TLCs).

In the write booster mode, the memory system 300 may write data to the first partition of SLC memory cells, which can be faster than writing data to MLC, TLC, QLC or other types of memory cells. Writing to multiple-level memory cells (e.g., MLC, TLC, QLC, etc.) may include writing data until the memory system 300 determines that the data has been correctly stored (e.g., stored without error), which can take additional time to do with more levels. The capacity of the first partition 335 may be limited so the memory system 300 may transfer the data to the second partition 340 (which may have higher capacity than the first partition) upon detection of a trigger condition. However, in some examples the trigger condition may occur at a time when it might be advantageous to leave the data in the write booster buffer (e.g., if the data is being frequently modified), which may be undesirable.

To prevent premature transfer of data from the first partition 335 to the second partition 340, the memory system 300 may use a flash counter for the first partition 335 (which may be included in the counter array 320) to select a timing for the transfer. For example, the memory system 300 may compare the value of the flash counter for the first partition to a threshold value and, if the value is greater than the threshold value, the memory system 300 may determine that the data is still being written to or modified in the first partition 335 as part of a write booster procedure and may delay transfer of the data for a threshold period of time. Thus, a timing for the transfer of data from a write booster buffer (e.g., the first partition 335 that includes SLC cells) to other blocks (e.g., TLC cells) may be based on (e.g., a function of) the write frequency for the write booster buffer (as indicated by the flash counter for the write booster buffer).

Figure 4:
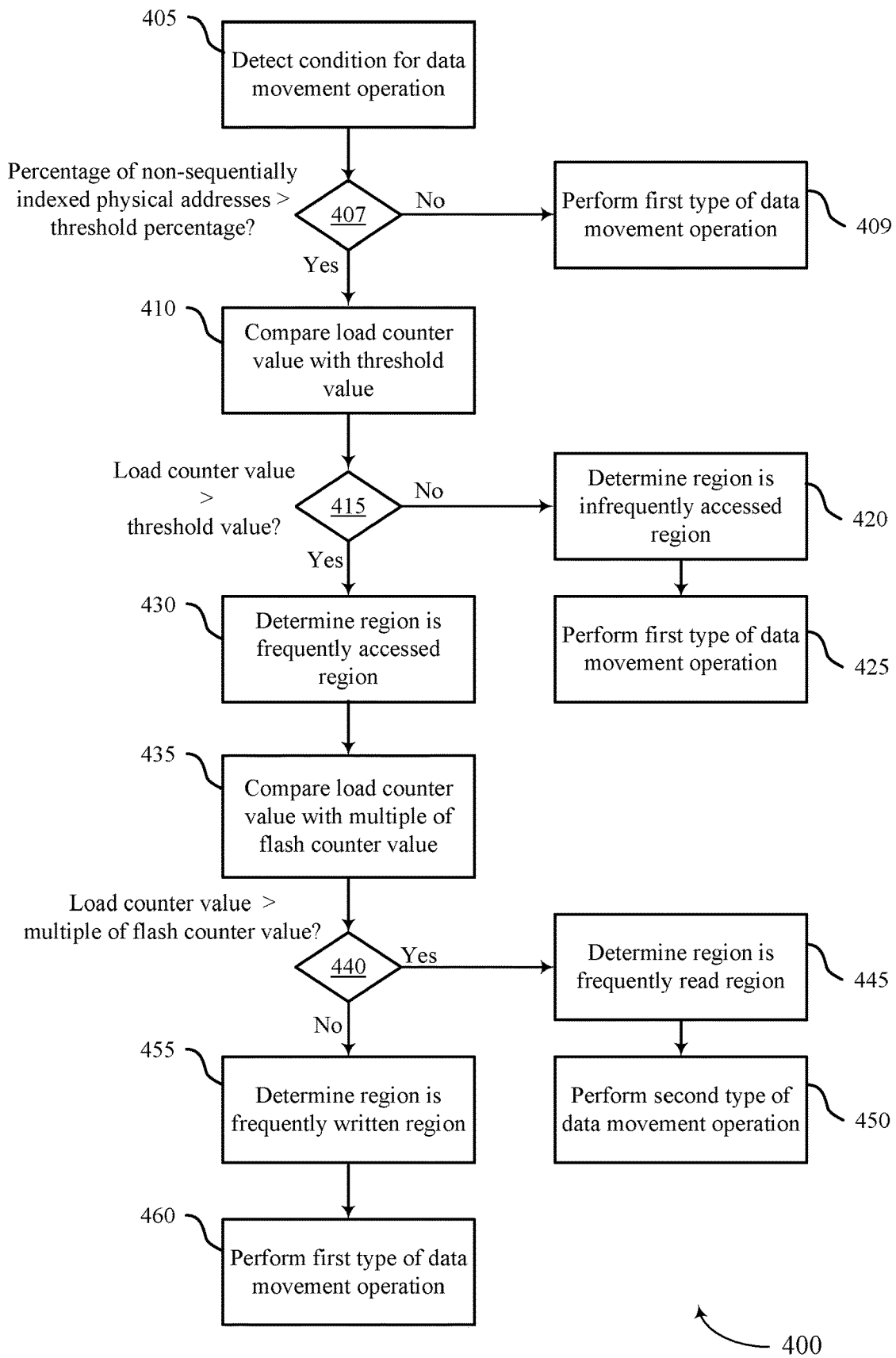
FIG. 4 illustrates an example of a process flow that supports data movement based on address table activity in accordance with examples as disclosed herein.

FIG. 4 illustrates an example of a process flow 400 that supports data movement based on address table activity in accordance with examples as disclosed herein. The process flow 400 may be implemented by a memory system as described herein. By implementing the process flow 400, the memory system may selectively perform the second type of data movement operation, which may improve system performance.

Aspects of the process flow 400 may be implemented by one or more controllers, among other components. Additionally or alternatively, aspects of the process flow 400 may be implemented as instructions stored in memory (e.g., firmware stored in a memory coupled with the memory system 300). For example, the instructions, if executed by a controller (e.g., the memory system controller 115, a local controller 135), may cause the controller to perform the operations of the process flow 400.

At 405, a condition for performing a data movement operation (e.g., a garbage collection operation) may be detected. For example, the memory system 300 may determine that a condition for performing a data movement operation for data of a region of an address table has been satisfied.

In some examples, the memory system 300 may how many of the physical addresses mapped to the region are non-sequentially addressed. At 407, it may be determined whether the percentage of non-sequentially indexed physical addresses in the block in question is greater than a threshold percentage (e.g., 20%). If, at 407, it is determined that the percentage of non-sequentially indexed physical addresses is less than the threshold percentage, the memory system 300 may proceed to 409 and perform the first type of data movement operation. In some cases, the first type of data movement operation may be an example of a refresh operation. If, at 407, it is determined that the percentage of non-sequentially indexed physical addresses in the block in question is greater than the threshold percentage, the memory system 300 may proceed to 410.

At 410, a value of the load counter for the region may be compared with a threshold value. For example, based on (e.g., in response to) detecting the condition at 405, the memory system 300 may compare the load counter for the region to the threshold value. A load counter for a region may refer to a counter for a quantity of times the region of the address table 315 has been transferred from the non-volatile memory device 310 to the volatile memory device 305 (e.g., loaded into the SRAM), which may occur in response to a memory access operation (e.g., a read operation, a write operation) that targets the logical addresses in the region.

At 415, it may be determined whether the value of the load counter is greater than the threshold value. For example, the memory system 300 may determine whether the value of the load counter is greater than the threshold value.

If, at 415, the memory system 300 determines that the value of the load counter is less than the threshold value, the memory system 300 may proceed to 420 and determine that the region is an infrequently accessed region (which may also be referred to as a "cold" region), where an infrequently accessed region refers to a region that is accessed fewer than a threshold amount of times during a threshold period of time. At 425, the first type of data movement operation may be performed. For example, the memory system 300 may perform the first type of data movement operation on the region based on (e.g., in response to) determining that the region is an infrequently accessed region. Performing the first type of data movement operation may include reading data associated with the region from a first set of memory cells with a first set of physical addresses and writing the data to a second set of memory cells with a second set of physical addresses that are sequentially indexed.

If, at 415, the memory system 300 determines that the value of the load counter is greater than the threshold value, the memory system 300 may proceed to 430 and determine that the region is frequently accessed region (which may also be referred to as a "hot" region), where a frequently accessed region refers to a region that is accessed more than a threshold amount of time during a threshold period of time.

At 435, the value of the load counter may be compared (e.g., by the memory system 300) with a threshold value that is equal to a multiple of the flash counter value. For example, if the load counter value is L and the flash counter value is F, the memory system 300 may compare the load counter L to xF, where x is a real number. At 440, it may be determined whether the load counter value is greater than the multiple of the flash counter. For example, the memory system 300 may determine whether L is greater than xF. A flash counter for a region may refer to a counter for a quantity of times the region of the address table 315 has been modified while in the volatile memory device 305 and transferred from the volatile memory device 305 to the non-volatile memory device 315 (e.g., new mapping information is written into the NAND), which may occur in response to a memory access operation (e.g., a write operation) that targets the logical addresses in the region.

If, at 440, the memory system 300 determines that the load counter value is greater than the multiple of the flash counter value, the memory system 300 may proceed to 445 and determine that the region is frequently read region, where a frequently read region may refer to a region that is read more than a threshold amount of time during a threshold period of time or may refer to a region that is read a threshold amount of times more than the region is written during the threshold period. At 450, the first type of data movement operation may be performed. For example, the memory system 300 may perform the first type of data movement operation on the region based on (e.g., in response to) determining that the region is a frequently read region. Performing the first type of data movement operation may include reading data associated with the region from a first set of memory cells with a first set of physical addresses and writing the data to a second set of memory cells with a second set of physical addresses that are non-sequentially indexed.

If, at 440, the memory system 300 determines that the load counter value is less than the multiple of the flash counter value, the memory system 300 may proceed to 455 and determine that the region is frequently written region, where a frequently written region may refer to a region that is written more than a threshold amount of time during a threshold period of time or may refer to a region that is written a threshold amount of times more than the region is read during the threshold period. At 460, the first type of data movement operation may be performed. For example, the memory system 300 may perform the first type of data movement operation on the region based on (e.g., in response to) determining that the region is a frequently written region.

Thus, the memory system 300 may selectively perform the second type of data movement operation, which may improve system performance. The second type of data movement operation may be an example of a garbage collection operation.

Although described with certain operations occurring before others, the order of operations may be modified. For example, the memory system 300 may perform 415, then 440, then 407. Regardless of the order of the operations, the memory system 300 may perform the first type of data movement operation if: 1) the load counter value is less than a threshold load value, or 2) the load counter value is less than a multiple of the flash counter value, or 3) the percentage of non-sequentially indexed physical addresses mapped to the set of logical addresses is less than a threshold percentage. Regardless of the order of the operations, the memory system 300 may perform the second type of data movement operation if: 1) the load counter value is greater than a threshold load value, 2) the load counter value is greater than a multiple of the flash counter value, and 3) the percentage of non-sequentially indexed physical addresses mapped to the set of logical addresses is greater than a threshold percentage. Although described as occurring sequentially (e.g., one at a time), two or more of the comparisons may be performed concurrently (e.g., at partially or wholly overlapping times).

Alternative examples of the foregoing may be implemented, where some operations partially overlap, are performed in a different order than described, are performed in parallel, or are not performed at all. In some cases, operations may include additional features not mentioned herein, or further operations may be added. Additionally, some operations may be performed multiple times or some combinations of operations may repeat or cycle.

Figure 5:
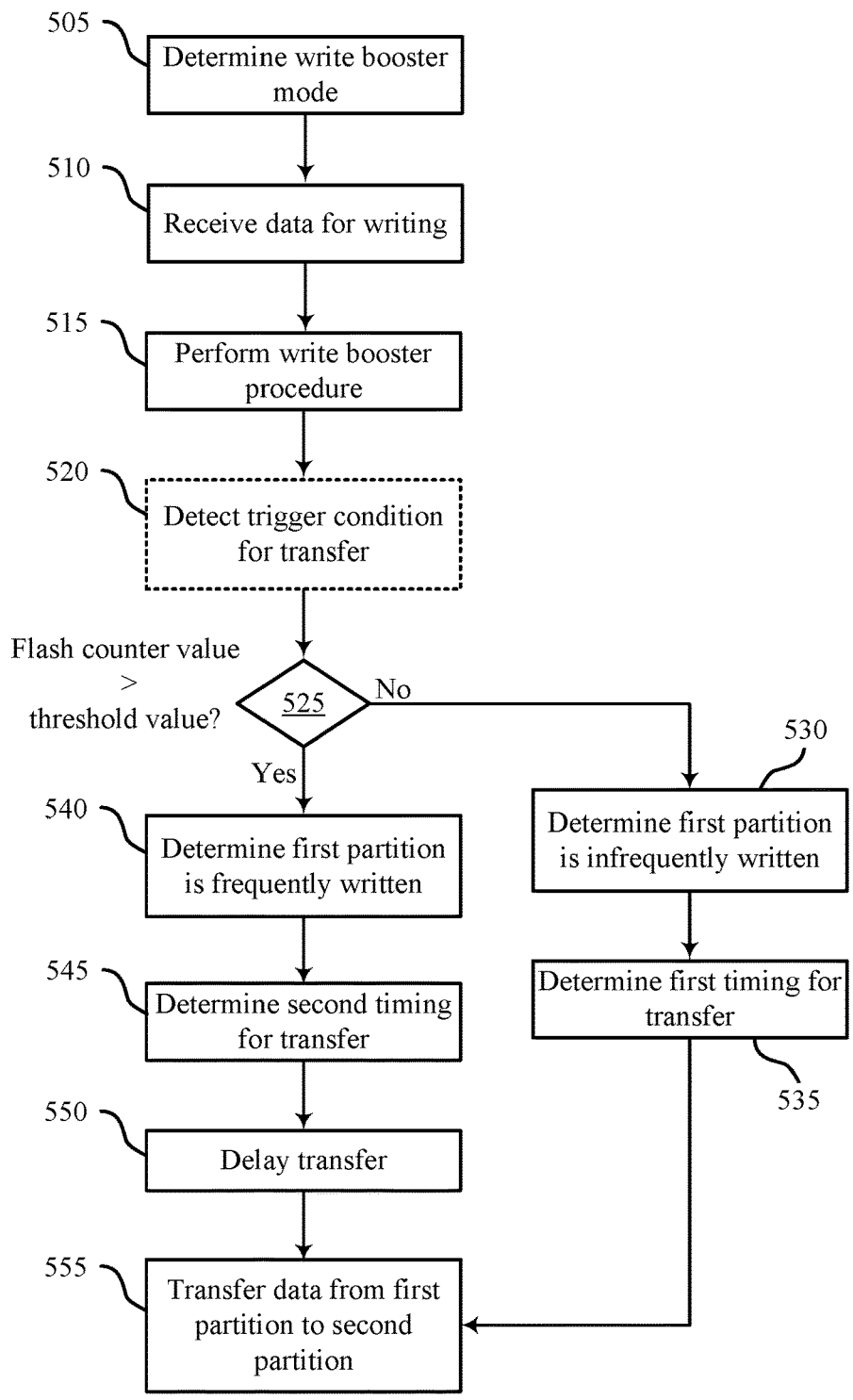
FIG. 5 illustrates an example of a process flow that supports data movement based on address table activity in accordance with examples as disclosed herein.

FIG. 5 illustrates an example of a process flow 500 that supports data movement based on address table activity in accordance with examples as disclosed herein. The process flow 500 may be implemented by a memory system as described herein. By implementing the process flow 500 the memory system may select an appropriate timing for transferring data from a write booster buffer.

Aspects of the process flow 500 may be implemented by one or more controllers, among other components. Additionally or alternatively, aspects of the process flow 500 may be implemented as instructions stored in memory (e.g., firmware stored in a memory coupled with the memory system 300). For example, the instructions, if executed by a controller (e.g., the memory system controller 115, a local controller 135), may cause the controller to perform the operations of the process flow 500.

At 505, a write booster mode may be determined. For example, the memory system 300 may determine that it is operating in the write booster mode. At 510, data for writing may be received. For example, the memory system 300 may receive data for writing from a host system. At 515, a write booster procedure may be performed. Writing data to MLC or TLC cells can take more time than writing data to SLC cells because the sense margins are smaller and it can take longer to place the state of the memory cell at the correct state (e.g., using writing and verification procedures). For example, the memory system 300 may repetitively write the data to, and read the data in the non-volatile memory device 310, in an effort to correctly store the data. Such a process can take longer in MLC and TLC cells than SLC cells because voltage differences between states of the memory cells can be smaller the more states the memory cell is configured to store.

Data stored in SLC cells can be written faster than other levels of memory cells (e.g., MLC, TLC, QLC) and may be more reliable (e.g., less susceptible to errors). The density of information, however, in a memory device can be less when using SLC cells than when other levels of memory cells (e.g., MLC, TLC, QLC). The write booster mode is configured to allow a memory system to write data into SLC cells (at least initially) and improve the write speed for performing host-initiated write commands and then transfer the data from the SLC cells (e.g., the write booster buffer) to other levels of memory cells (e.g., MLC, TLC, QLC) at a time when performance and latency may be less of a concern.

At 520, a trigger condition for transferring the data from the first partition (e.g., the write booster buffer) to a second partition (MLC, TLC, QLC cells) may be detected. For example, the memory system 300 may determine that the trigger condition for transferring the data is satisfied.

At 525, it may be determined whether the flash counter value for the first partition 335 (e.g., write booster buffer) is greater than a threshold value. For example, the memory system 300 may determine whether the flash counter for the first partition 335 is greater than a threshold value. The memory system 300 may make the determination by comparing the flash counter value to the threshold value. In some examples, the memory system 300 may perform the determination at 525 based on (e.g., in response to) the trigger condition detected at 520.

If, at 525, it is determined that the flash counter value is less than the threshold value, the memory system 300 may proceed to 530 and determine that the first partition 335 is being infrequently written or otherwise modified. At 535, a first timing for transferring the data from the first partition to the second partition may be determined. In some examples, the first timing for transferring the data may be an example of a first delay from the trigging event before a transfer is attempted. The memory system 300 may determine a first period of time during which to transfer the data from the first partition 335 to the second partition 340. The starting point for the first period of time may be delayed relative to the triggering event based on the first partition 335 being infrequently written. At 555, the data may be transferred from the first partition to the second partition. For example, the memory system 300 may transfer the data from the first partition 335 to the second partition 340 based on (e.g., in accordance with) the first timing.

If, at 525, it is determined that the flash counter value is greater than the threshold value, the memory system 300 may proceed to 540 and determine that the first partition 335 is being frequently written or modified. At 545, a second timing for transferring the data from the first partition to the second partition may be determined. In some examples, the second timing for transferring the data may be an example of a first delay from the trigging event before a transfer is attempted. For example, the memory system 300 may determine a second period of time during which to transfer the data from the first partition 335 to the second partition 340. The starting point for the second period of time may be delayed relative to the triggering event based on the first partition 335 being frequently written.

At 550, the transfer of the data from the first partition to the second partition may be delayed based on determining whether the flash counter value for the write booster buffer satisfies the threshold value. For example, the memory system 300 may wait for a threshold amount of time to expire, or for a transfer trigger condition to be detected, before transferring the data from the first partition 335 to the second partition 340. At 555, the data may be transferred from the first partition to the second partition. For example, the memory system 300 may transfer the data from the first partition 335 to the second partition 340 based on the second timing, which may be different than the first timing. Thus, the memory system 300 may select an appropriate timing for transferring data from a write booster buffer.

Figure 6:
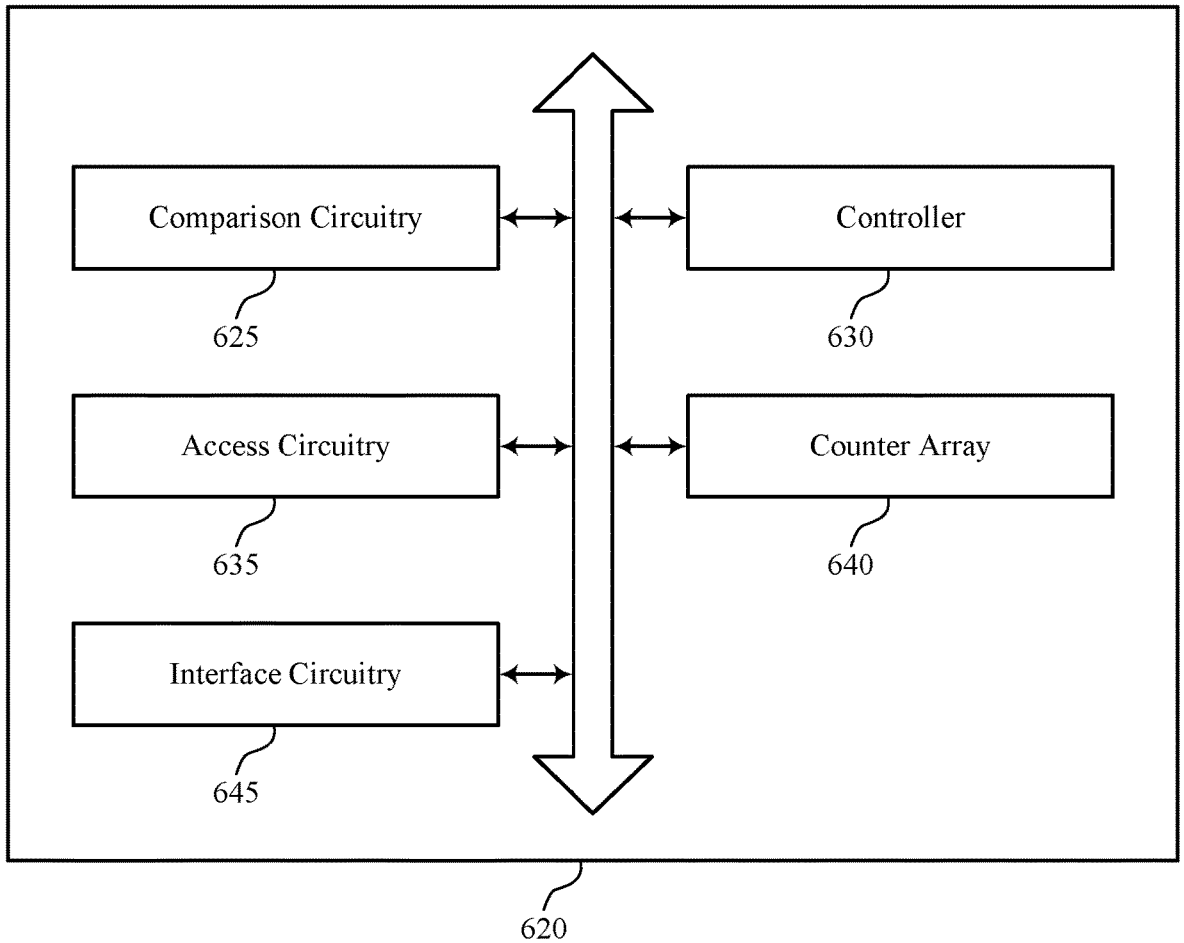
FIG. 6 shows a block diagram of a memory system that supports data movement based on address table activity in accordance with examples as disclosed herein.

FIG. 6 shows a block diagram 600 of a memory system 620 that supports data movement based on address table activity in accordance with examples as disclosed herein. The memory system 620 may be an example of aspects of a memory system as described with reference to FIGS. 1 through 5. The memory system 620, or various components thereof, may be an example of means for performing various aspects of data movement based on address table activity as described herein. For example, the memory system 620 may include a comparison circuitry 625, a controller 630, an access circuitry 635, a counter array 640, an interface circuitry 645, or any combination thereof. Each of these components may communicate, directly or indirectly, with one another (e.g., via one or more buses).

The comparison circuitry 625 may be configured as or otherwise support a means for comparing a first value of a first counter for a set of logical addresses to a first threshold value, where the set of logical addresses is included in a logical-to-physical address mapping, and where the first counter configured to indicate a quantity of times the set of logical addresses has been read from a non-volatile memory device and written to a volatile memory device. In some examples, the comparison circuitry 625 may be configured as or otherwise support a means for comparing the first value of the first counter to a second threshold value that is based at least in part on a second value of a second counter for the set of logical addresses, the second counter configured to indicate a quantity of times the set of logical addresses of the logical-to-physical address mapping has been written to the non-volatile memory device from the volatile memory device. The controller 630 may be configured as or otherwise support a means for selecting, from a plurality of types of data movement operations supported by the non-volatile memory device, a first type of data movement operation based at least in part on comparing the first value to the first threshold value and the second threshold value. The access circuitry 635 may be configured as or otherwise support a means for performing the first type of data movement operation for data associated with the set of logical addresses based at least in part on the selection.

In some examples, the set of logical addresses includes a quantity of non-sequentially indexed logical addresses, and the comparison circuitry 625 may be configured as or otherwise support a means for comparing the quantity of non-sequentially indexed logical addresses to a threshold quantity, where the first type of data movement operation is selected based at least in part on comparing the quantity of non-sequentially indexed logical addresses to the threshold quantity.

In some examples, the controller 630 may be configured as or otherwise support a means for determining that the first value is greater than the first threshold value, where comparing the first value to the second value is based at least in part on the first value being greater than the first threshold value. In some examples, the second threshold value includes a multiple of the second value.

In some examples, the access circuitry 635 may be configured as or otherwise support a means for reading the data from memory cells that have non-sequentially indexed physical addresses. In some examples, the access circuitry 635 may be configured as or otherwise support a means for writing the data to memory cells that have sequentially indexed physical addresses.

In some examples, the controller 630 may be configured as or otherwise support a means for determining that the first value of the first counter is greater than the first threshold value, where the first type of data movement operation is selected based at least in part on the first value of the first counter being greater than the first threshold value.

In some examples, the controller 630 may be configured as or otherwise support a means for determining that the first value of the first counter is greater than the second threshold value, where the first type of data movement operation is selected based at least in part on the first value of the first counter being greater than the second threshold value.

In some examples, the access circuitry 635 may be configured as or otherwise support a means for updating the logical-to-physical address mapping to include an indication that the set of logical addresses is mapped to memory cells that have sequentially indexed physical addresses.

In some examples, to support performing the first type of data movement operation, the access circuitry 635 may be configured as or otherwise support a means for reading the data from memory cells that have non-sequentially indexed physical addresses. In some examples, to support performing the first type of data movement operation, the access circuitry 635 may be configured as or otherwise support a means for writing the data to memory cells that have non-sequentially indexed physical addresses.

In some examples, the controller 630 may be configured as or otherwise support a means for determining that the first value of the first counter is greater than the first threshold value. In some examples, the controller 630 may be configured as or otherwise support a means for determining that the first value is less than the second threshold value, where the first type of data movement operation is selected based at least in part on the first value being greater than the first threshold value and less than the second threshold value.

In some examples, the interface circuitry 645 may be configured as or otherwise support a means for transferring the set of logical addresses to the volatile memory device based at least in part on receiving an access command to access logical address of the set of logical addresses. In some examples, the counter array 640 may be configured as or otherwise support a means for incrementing the first value of the first counter based at least in part on transferring the set of logical addresses to the volatile memory device.

The counter array 640 may be configured as or otherwise support a means for determining a value of a counter that is configured to indicate a quantity of times a logical-to-physical address mapping for a first partition of a non-volatile memory device has been read from the non-volatile memory device and written to a volatile memory device, the first partition including a write booster buffer configured to store information in single-level memory cells. In some examples, the controller 630 may be configured as or otherwise support a means for determining, based at least in part on the value of the counter, a timing for transferring data from the first partition to a second partition of the non-volatile memory device that includes multiple-level memory cells. The interface circuitry 645 may be configured as or otherwise support a means for transferring the data from the first partition to the second partition based at least in part on the timing.

In some examples, the comparison circuitry 625 may be configured as or otherwise support a means for determining that the value of the counter is greater than a threshold value, where the timing for transferring the data is based at least in part on the value of the counter being greater than the threshold value.

In some examples, the comparison circuitry 625 may be configured as or otherwise support a means for determining that the value of the counter is less than a threshold value, where the timing for transferring the data is based at least in part on the value of the counter being less than the threshold value.

In some examples, the controller 630 may be configured as or otherwise support a means for determining that a trigger condition for transferring the data from the first partition to the second partition is satisfied. In some examples, the controller 630 may be configured as or otherwise support a means for delaying, based at least in part on the timing, transferring the data for a threshold duration of time based at least in part on determining that the trigger condition is satisfied.

In some examples, the comparison circuitry 625 may be configured as or otherwise support a means for determining that the value of the counter is greater than a threshold value, where the transfer of the data is delayed based at least in part on the value of the counter being greater than the threshold value.

In some examples, the interface circuitry 645 may be configured as or otherwise support a means for transferring the logical-to-physical address mapping to the volatile memory device based at least in part on receiving an access command to access the non-volatile memory device. In some examples, the counter array 640 may be configured as or otherwise support a means for incrementing the value of the counter based at least in part on transferring the logical-to-physical address mapping to the volatile memory device.

In some examples, to support transferring the data, the access circuitry 635 may be configured as or otherwise support a means for reading the data from the first partition. In some examples, to support transferring the data, the access circuitry 635 may be configured as or otherwise support a means for writing the data to the second partition.

In some examples, multi-level memory cells configured to store two bits of information; tri-level memory cells configured to store three bits of information; or quad-level memory cells configured to store four bits of information.

Figure 7:
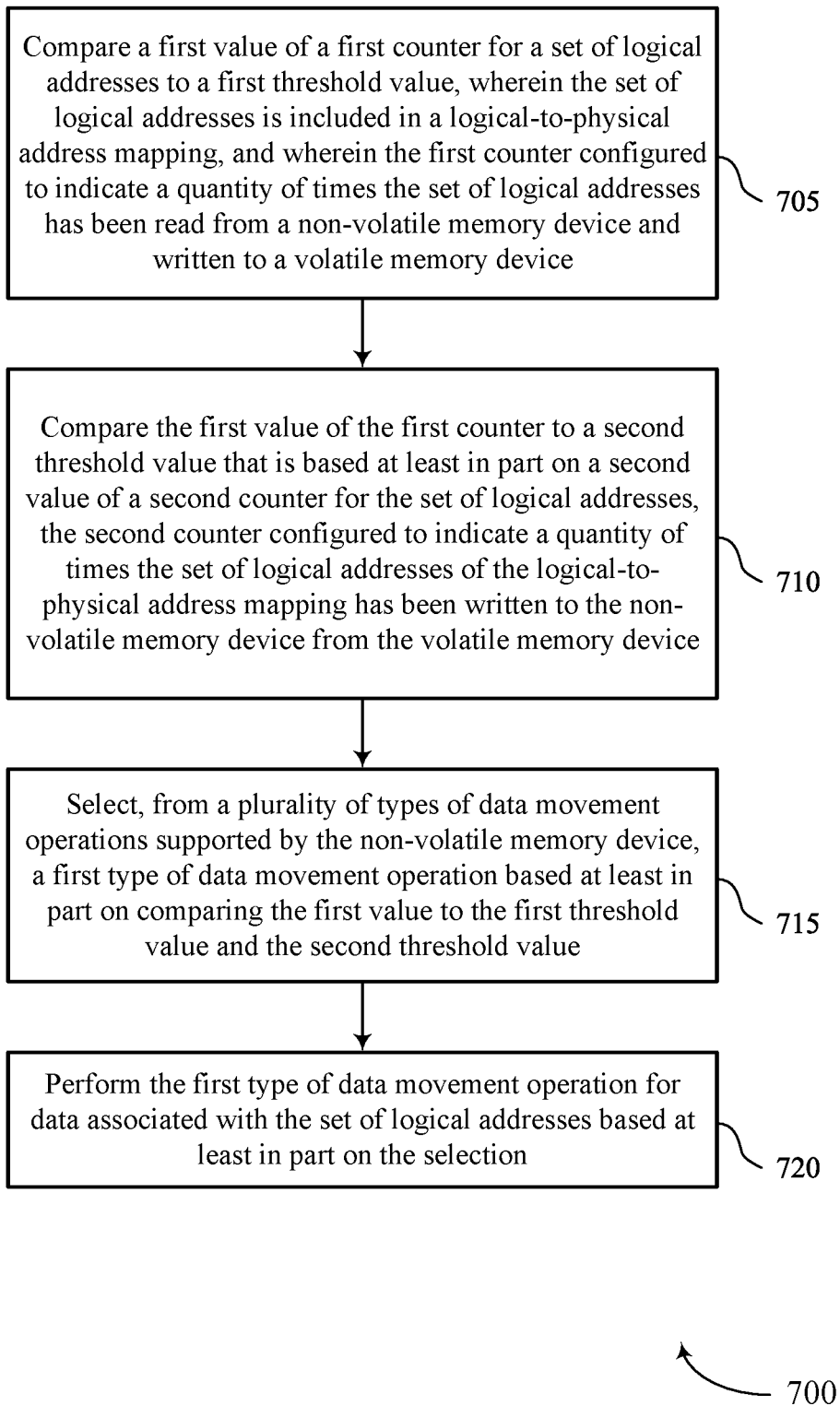
FIGS. 7 and 8 show flowcharts illustrating a method or methods that support data movement based on address table activity in accordance with examples as disclosed herein.

FIG. 7 shows a flowchart illustrating a method 700 that supports data movement based on address table activity in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include comparing a first value of a first counter for a set of logical addresses to a first threshold value, where the set of logical addresses is included in a logical-to-physical address mapping, and where the first counter configured to indicate a quantity of times the set of logical addresses has been read from a non-volatile memory device and written to a volatile memory device. The operations of 705 may be performed in accordance with examples as disclosed herein. In some examples, aspects of the operations of 705 may be performed by a comparison circuitry 625 as described with reference to FIG. 6.

At 710, the method may include comparing the first value of the first counter to a second threshold value that is based at least in part on a second value of a second counter for the set of logical addresses, the second counter configured to indicate a quantity of times the set of logical addresses of the logical-to-physical address mapping has been written to the non-volatile memory device from the volatile memory device. The operations of 710 may be performed in accordance with examples as disclosed herein. In some examples, aspects of the operations of 710 may be performed by a comparison circuitry 625 as described with reference to FIG. 6.

At 715, the method may include selecting, from a plurality of types of data movement operations supported by the non-volatile memory device, a first type of data movement operation based at least in part on comparing the first value to the first threshold value and the second threshold value. The operations of 715 may be performed in accordance with examples as disclosed herein. In some examples, aspects of the operations of 715 may be performed by a controller 630 as described with reference to FIG. 6.

At 720, the method may include performing the first type of data movement operation for data associated with the set of logical addresses based at least in part on the selection. The operations of 720 may be performed in accordance with examples as disclosed herein. In some examples, aspects of the operations of 720 may be performed by an access circuitry 635 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for comparing a first value of a first counter for a set of logical addresses to a first threshold value, where the set of logical addresses is included in a logical-to-physical address mapping, and where the first counter configured to indicate a quantity of times the set of logical addresses has been read from a non-volatile memory device and written to a volatile memory device; comparing the first value of the first counter to a second threshold value that is based at least in part on a second value of a second counter for the set of logical addresses, the second counter configured to indicate a quantity of times the set of logical addresses of the logical-to-physical address mapping has been written to the non-volatile memory device from the volatile memory device; selecting, from a plurality of types of data movement operations supported by the non-volatile memory device, a first type of data movement operation based at least in part on comparing the first value to the first threshold value and the second threshold value; and performing the first type of data movement operation for data associated with the set of logical addresses based at least in part on the selection.

Aspect 2: The method, apparatus, or non-transitory computer-readable medium of aspect 1 where the set of logical addresses includes a quantity of non-sequentially indexed logical addresses and the method, apparatuses, and non-transitory computer-readable medium, further includes operations, features, circuitry, logic, means, or instructions, or any combination thereof for comparing the quantity of non-sequentially indexed logical addresses to a threshold quantity, where the first type of data movement operation is selected based at least in part on comparing the quantity of non-sequentially indexed logical addresses to the threshold quantity.

Aspect 3: The method, apparatus, or non-transitory computer-readable medium of any of aspects 1 through 2, further including operations, features, circuitry, logic, means, or instructions, or any combination thereof for determining that the first value is greater than the first threshold value, where comparing the first value to the second value is based at least in part on the first value being greater than the first threshold value.

Aspect 4: The method, apparatus, or non-transitory computer-readable medium of any of aspects 1 through 3 where the second threshold value includes a multiple of the second value.

Aspect 5: The method, apparatus, or non-transitory computer-readable medium of any of aspects 1 through 4, further including operations, features, circuitry, logic, means, or instructions, or any combination thereof for reading the data from memory cells that have non-sequentially indexed physical addresses and writing the data to memory cells that have sequentially indexed physical addresses.

Aspect 6: The method, apparatus, or non-transitory computer-readable medium of aspect 5, further including operations, features, circuitry, logic, means, or instructions, or any combination thereof for determining that the first value of the first counter is greater than the first threshold value, where the first type of data movement operation is selected based at least in part on the first value of the first counter being greater than the first threshold value.

Aspect 7: The method, apparatus, or non-transitory computer-readable medium of any of aspects 5 through 6, further including operations, features, circuitry, logic, means, or instructions, or any combination thereof for determining that the first value of the first counter is greater than the second threshold value, where the first type of data movement operation is selected based at least in part on the first value of the first counter being greater than the second threshold value.

Aspect 8: The method, apparatus, or non-transitory computer-readable medium of any of aspects 5 through 7, further including operations, features, circuitry, logic, means, or instructions, or any combination thereof for updating the logical-to-physical address mapping to include an indication that the set of logical addresses is mapped to memory cells that have sequentially indexed physical addresses.

Aspect 9: The method, apparatus, or non-transitory computer-readable medium of any of aspects 1 through 8 where performing the first type of data movement operation includes operations, features, circuitry, logic, means, or instructions, or any combination thereof for reading the data from memory cells that have non-sequentially indexed physical addresses and writing the data to memory cells that have non-sequentially indexed physical addresses.

Aspect 10: The method, apparatus, or non-transitory computer-readable medium of aspect 9, further including operations, features, circuitry, logic, means, or instructions, or any combination thereof for determining that the first value of the first counter is greater than the first threshold value and determining that the first value is less than the second threshold value, where the first type of data movement operation is selected based at least in part on the first value being greater than the first threshold value and less than the second threshold value.

Aspect 11: The method, apparatus, or non-transitory computer-readable medium of any of aspects 1 through 10, further including operations, features, circuitry, logic, means, or instructions, or any combination thereof for transferring the set of logical addresses to the volatile memory device based at least in part on receiving an access command to access logical address of the set of logical addresses and incrementing the first value of the first counter based at least in part on transferring the set of logical addresses to the volatile memory device.

Figure 8:
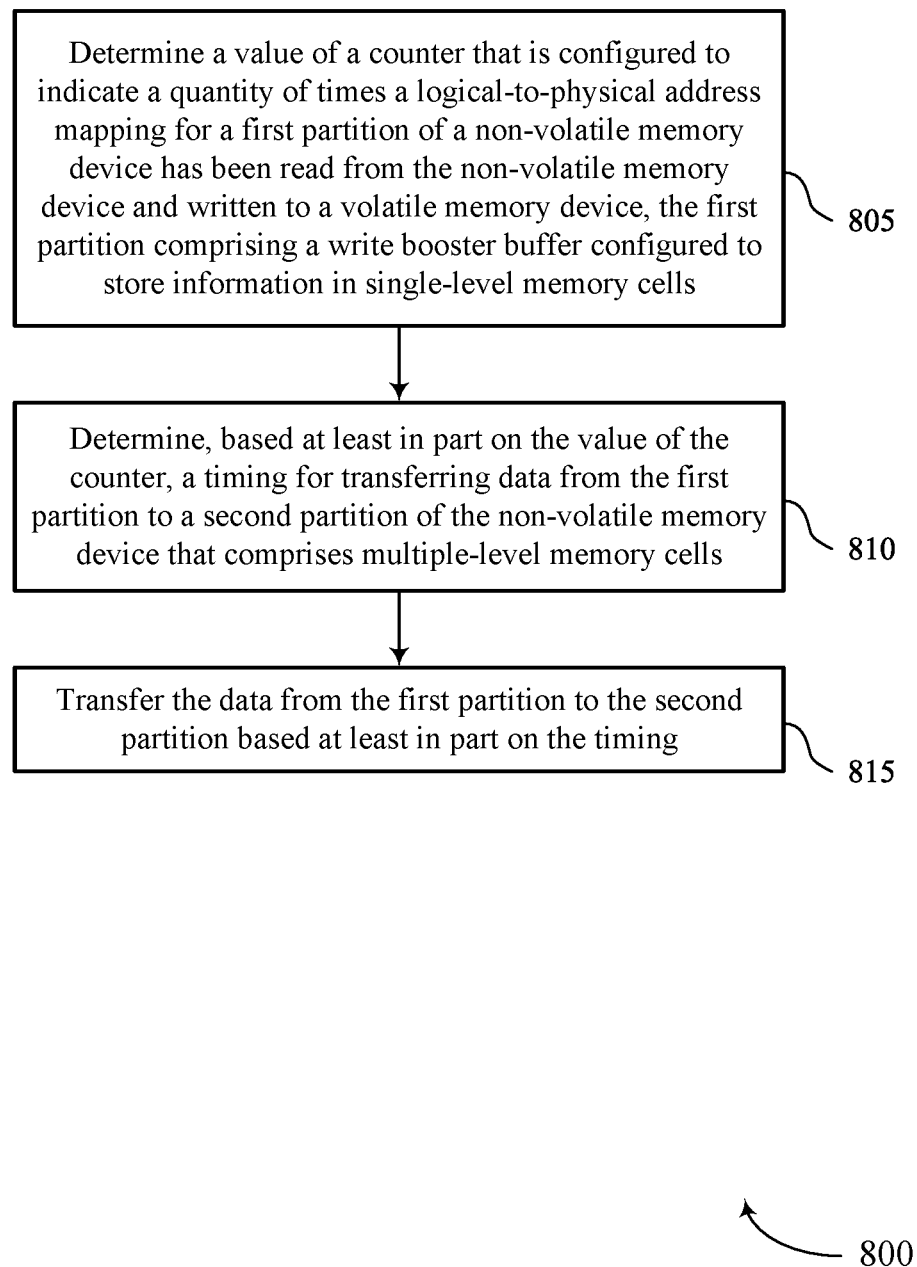

FIG. 8 shows a flowchart illustrating a method 800 that supports data movement based on address table activity in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include determining a value of a counter that is configured to indicate a quantity of times a logical-to-physical address mapping for a first partition of a non-volatile memory device has been read from the non-volatile memory device and written to a volatile memory device, the first partition including a write booster buffer configured to store information in single-level memory cells. The operations of 805 may be performed in accordance with examples as disclosed herein. In some examples, aspects of the operations of 805 may be performed by a counter array 640 as described with reference to FIG. 6.

At 810, the method may include determining, based at least in part on the value of the counter, a timing for transferring data from the first partition to a second partition of the non-volatile memory device that includes multiple-level memory cells. The operations of 810 may be performed in accordance with examples as disclosed herein. In some examples, aspects of the operations of 810 may be performed by a controller 630 as described with reference to FIG. 6.

At 815, the method may include transferring the data from the first partition to the second partition based at least in part on the timing. The operations of 815 may be performed in accordance with examples as disclosed herein. In some examples, aspects of the operations of 815 may be performed by an interface circuitry 645 as described with reference to FIG. 6.

In some examples, an apparatus as described herein may perform a method or methods, such as the method 800. The apparatus may include features, circuitry, logic, means, or instructions (e.g., a non-transitory computer-readable medium storing instructions executable by a processor), or any combination thereof for performing the following aspects of the present disclosure:

Aspect 12: A method, apparatus, or non-transitory computer-readable medium including operations, features, circuitry, logic, means, or instructions, or any combination thereof for determining a value of a counter that is configured to indicate a quantity of times a logical-to-physical address mapping for a first partition of a non-volatile memory device has been read from the non-volatile memory device and written to a volatile memory device, the first partition including a write booster buffer configured to store information in single-level memory cells; determining, based at least in part on the value of the counter, a timing for transferring data from the first partition to a second partition of the non-volatile memory device that includes multiple-level memory cells; and transferring the data from the first partition to the second partition based at least in part on the timing.

Aspect 13: The method, apparatus, or non-transitory computer-readable medium of aspect 12, further including operations, features, circuitry, logic, means, or instructions, or any combination thereof for determining that the value of the counter is greater than a threshold value, where the timing for transferring the data is based at least in part on the value of the counter being greater than the threshold value.

Aspect 14: The method, apparatus, or non-transitory computer-readable medium of any of aspects 12 through 13, further including operations, features, circuitry, logic, means, or instructions, or any combination thereof for determining that the value of the counter is less than a threshold value, where the timing for transferring the data is based at least in part on the value of the counter being less than the threshold value.

Aspect 15: The method, apparatus, or non-transitory computer-readable medium of any of aspects 12 through 14, further including operations, features, circuitry, logic, means, or instructions, or any combination thereof for determining that a trigger condition for transferring the data from the first partition to the second partition is satisfied and delaying, based at least in part on the timing, transferring the data for a threshold duration of time based at least in part on determining that the trigger condition is satisfied.

Aspect 16: The method, apparatus, or non-transitory computer-readable medium of aspect 15, further including operations, features, circuitry, logic, means, or instructions, or any combination thereof for determining that the value of the counter is greater than a threshold value, where the transfer of the data is delayed based at least in part on the value of the counter being greater than the threshold value.

Aspect 17: The method, apparatus, or non-transitory computer-readable medium of any of aspects 12 through 16, further including operations, features, circuitry, logic, means, or instructions, or any combination thereof for transferring the logical-to-physical address mapping to the volatile memory device based at least in part on receiving an access command to access the non-volatile memory device and incrementing the value of the counter based at least in part on transferring the logical-to-physical address mapping to the volatile memory device.

Aspect 18: The method, apparatus, or non-transitory computer-readable medium of any of aspects 12 through 17 where transferring the data includes operations, features, circuitry, logic, means, or instructions, or any combination thereof for reading the data from the first partition and writing the data to the second partition.

Aspect 19: The method, apparatus, or non-transitory computer-readable medium of any of aspects 12 through 18 where multi-level memory cells configured to store two bits of information; tri-level memory cells configured to store three bits of information; or quad-level memory cells configured to store four bits of information.

It should be noted that the methods described above describe possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 20: An apparatus, including: a memory system including a volatile memory device and a non-volatile memory device configured to store a logical-to-physical address mapping that includes a set of logical addresses; and a controller coupled with the non-volatile memory device and configured to cause the apparatus to: compare a first value of a first counter for the set of logical addresses to a first threshold value, the first counter configured to indicate a quantity of times the set of logical addresses has been read from the non-volatile memory device and written to the volatile memory device; compare the first value of the first counter to a second threshold value that is based at least in part on a second value of a second counter for the set of logical addresses, the second counter configured to indicate a quantity of times the set of logical addresses of the logical-to-physical address mapping has been written to the non-volatile memory device from the volatile memory device; select, from a plurality of types of data movement operations supported by the non-volatile memory device, a first type of data movement operation based at least in part on comparing the first value to the first threshold value and the second threshold value; and perform the first type of data movement operation for data associated with the set of logical addresses based at least in part on the selection.

Aspect 21: The apparatus of aspect 20, where the set of logical addresses includes a quantity of non-sequentially indexed logical addresses, and where the controller is configured to cause the apparatus to: compare the quantity of non-sequentially indexed logical addresses to a threshold quantity, where the first type of data movement operation is selected based at least in part on comparing the quantity of non-sequentially indexed logical addresses to the threshold quantity.

Aspect 22: The apparatus of any of aspects 20 through 21, where the controller is configured to cause the apparatus to: determine that the first value is greater than the first threshold value, where comparing the first value to the second value is based at least in part on the first value being greater than the first threshold value.

Aspect 23: The apparatus of any of aspects 20 through 22, where the second threshold value includes a multiple of the second value.

Aspect 24: The apparatus of any of aspects 20 through 23, where the controller is configured to cause the apparatus to perform the first type of data movement operation by being configured to cause the apparatus to: read the data from memory cells that have non-sequentially indexed physical addresses; and write the data to memory cells that have sequentially indexed physical addresses.

Aspect 25: The apparatus of aspect 24, where the controller is further configured to cause the apparatus to: determine that the first value of the first counter is greater than the first threshold value, where the first type of data movement operation is selected based at least in part on the first value of the first counter being greater than the first threshold value.

Aspect 26: The apparatus of any of aspects 24 through 25, where the controller is further configured to cause the apparatus to: determine that the first value of the first counter is greater than the second threshold value, where the first type of data movement operation is selected based at least in part on the first value of the first counter being greater than the second threshold value.

Aspect 27: The apparatus of any of aspects 24 through 26, where the controller is further configured to cause the apparatus to: update the logical-to-physical address mapping to include an indication that the set of logical addresses is mapped to memory cells that have sequentially indexed physical addresses.

Aspect 28: The apparatus of any of aspects 20 through 27, where the controller is configured to cause the apparatus to perform the first type of data movement operation by being configured to cause the apparatus to: read the data from memory cells that have non-sequentially indexed physical addresses; and write the data to memory cells that have non-sequentially indexed physical addresses.

Aspect 29: The apparatus of aspect 28, where the controller is further configured to cause the apparatus to: determine that the first value of the first counter is greater than the first threshold value; and determine that the first value is less than the second threshold value, where the first type of data movement operation is selected based at least in part on the first value being greater than the first threshold value and less than the second threshold value.

Aspect 30: The apparatus of any of aspects 20 through 29, where the controller is further configured to cause the apparatus to: transfer the set of logical addresses to the volatile memory device based at least in part on receiving an access command to access logical address of the set of logical addresses; and increment the first value of the first counter based at least in part on transferring the set of logical addresses to the volatile memory device.

An apparatus is described. The following provides an overview of aspects of the apparatus as described herein:

Aspect 31: An apparatus, including: a memory system including a non-volatile memory device and a volatile memory device; and a controller coupled with the non-volatile memory device and configured to cause the apparatus to: determine a value of a counter that is configured to indicate a quantity of times a logical-to-physical address mapping for a first partition of the non-volatile memory device has been read from the non-volatile memory device and written to the volatile memory device, the first partition including a write booster buffer configured to store information in single-level memory cells; determine, based at least in part on the value of the counter, a timing for transferring data from the first partition to a second partition of the non-volatile memory device that includes multiple-level memory cells; and transfer the data from the first partition to the second partition based at least in part on the timing.

Aspect 32: The apparatus of aspect 31, where the controller is further configured to cause the apparatus to: determine that the value of the counter is greater than a threshold value, where the timing for transferring the data is based at least in part on the value of the counter being greater than the threshold value.

Aspect 33: The apparatus of any of aspects 31 through 32, where the controller is further configured to cause the apparatus to: determine that the value of the counter is less than a threshold value, where the timing for transferring the data is based at least in part on the value of the counter being less than the threshold value.

Aspect 34: The apparatus of any of aspects 31 through 33, where the controller is further configured to cause the apparatus to: determine that a trigger condition for transferring the data from the first partition to the second partition is satisfied; and delay, based at least in part on the timing, transferring the data for a threshold duration of time based at least in part on determining that the trigger condition is satisfied.

Aspect 35: The apparatus of aspect 34, where the controller is further configured to cause the apparatus to: determine that the value of the counter is greater than a threshold value, where the transfer of the data is delayed based at least in part on the value of the counter being greater than the threshold value.

Aspect 36: The apparatus of any of aspects 31 through 35, where the controller is further configured to cause the apparatus to: transfer the logical-to-physical address mapping to the volatile memory device based at least in part on receiving an access command to access the non-volatile memory device; and increment the value of the counter based at least in part on transferring the logical-to-physical address mapping to the volatile memory device.

Aspect 37: The apparatus of any of aspects 31 through 36, where the controller is configured to cause the apparatus to transfer the data by being configured to cause the apparatus to: read the data from the first partition; and write the data to the second partition.

Aspect 38: The apparatus of any of aspects 31 through 37, where the multiple-level memory cells include: multi-level memory cells configured to store two bits of information; tri-level memory cells configured to store three bits of information; or quad-level memory cells configured to store four bits of information.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
    a memory system comprising a volatile memory device and a non-volatile memory device configured to store a logical-to-physical address mapping that includes a set of logical addresses; and
    a controller coupled with the non-volatile memory device and configured to cause the apparatus to:
        compare a first value of a first counter for the set of logical addresses to a first threshold value, the first counter configured to indicate a quantity of times the set of logical addresses has been read from the non-volatile memory device and written to the volatile memory device;
        compare the first value of the first counter to a second threshold value that is based at least in part on a second value of a second counter for the set of logical addresses, the second counter configured to indicate a quantity of times the set of logical addresses of the logical-to-physical address mapping has been written to the non-volatile memory device from the volatile memory device;
        select, from a plurality of types of data movement operations supported by the non-volatile memory device, a first type of data movement operation based at least in part on comparing the first value to the first threshold value and the second threshold value; and
        perform the first type of data movement operation for data associated with the set of logical addresses based at least in part on the selection.

2. The apparatus of claim 1, wherein the set of logical addresses comprises a quantity of non-sequentially indexed logical addresses, and wherein the controller is configured to cause the apparatus to:
    compare the quantity of non-sequentially indexed logical addresses to a threshold quantity, wherein the first type of data movement operation is selected based at least in part on comparing the quantity of non-sequentially indexed logical addresses to the threshold quantity.

3. The apparatus of claim 1, wherein the controller is configured to cause the apparatus to:
    determine that the first value is greater than the first threshold value, wherein comparing the first value to the second value is based at least in part on the first value being greater than the first threshold value.

4. The apparatus of claim 1, wherein the second threshold value comprises a multiple of the second value.

5. The apparatus of claim 1, wherein the controller is configured to cause the apparatus to perform the first type of data movement operation by being configured to cause the apparatus to:
    read the data from memory cells that have non-sequentially indexed physical addresses; and
    write the data to memory cells that have sequentially indexed physical addresses.

6. The apparatus of claim 5, wherein the controller is further configured to cause the apparatus to:
    determine that the first value of the first counter is greater than the first threshold value, wherein the first type of data movement operation is selected based at least in part on the first value of the first counter being greater than the first threshold value.

7. The apparatus of claim 5, wherein the controller is further configured to cause the apparatus to:
determine that the first value of the first counter is greater than the second threshold value, wherein the first type of data movement operation is selected based at least in part on the first value of the first counter being greater than the second threshold value.

8. The apparatus of claim 5, wherein the controller is further configured to cause the apparatus to:
update the logical-to-physical address mapping to include an indication that the set of logical addresses is mapped to memory cells that have sequentially indexed physical addresses.

9. The apparatus of claim 1, wherein the controller is configured to cause the apparatus to perform the first type of data movement operation by being configured to cause the apparatus to:
read the data from memory cells that have non-sequentially indexed physical addresses; and
write the data to memory cells that have non-sequentially indexed physical addresses.

10. The apparatus of claim 9, wherein the controller is further configured to cause the apparatus to:
determine that the first value of the first counter is greater than the first threshold value; and
determine that the first value is less than the second threshold value, wherein the first type of data movement operation is selected based at least in part on the first value being greater than the first threshold value and less than the second threshold value.

11. The apparatus of claim 1, wherein the controller is further configured to cause the apparatus to:
transfer the set of logical addresses to the volatile memory device based at least in part on receiving an access command to access logical address of the set of logical addresses; and
increment the first value of the first counter based at least in part on transferring the set of logical addresses to the volatile memory device.

12. An apparatus, comprising:
a memory system comprising a non-volatile memory device and a volatile memory device; and
a controller coupled with the non-volatile memory device and configured to cause the apparatus to:
determine a value of a counter that is configured to indicate a quantity of times a logical-to-physical address mapping for a first partition of the non-volatile memory device has been read from the non-volatile memory device and written to the volatile memory device, the first partition comprising a write booster buffer configured to store information in single-level memory cells;
determine, based at least in part on the value of the counter, a timing for transferring data from the first partition to a second partition of the non-volatile memory device that comprises multiple-level memory cells; and
transfer the data from the first partition to the second partition based at least in part on the timing.

13. The apparatus of claim 12, wherein the controller is further configured to cause the apparatus to:
determine that the value of the counter is greater than a threshold value, wherein the timing for transferring the data is based at least in part on the value of the counter being greater than the threshold value.

14. The apparatus of claim 12, wherein the controller is further configured to cause the apparatus to:
determine that the value of the counter is less than a threshold value, wherein the timing for transferring the data is based at least in part on the value of the counter being less than the threshold value.

15. The apparatus of claim 12, wherein the controller is further configured to cause the apparatus to:
determine that a trigger condition for transferring the data from the first partition to the second partition is satisfied; and
delay, based at least in part on the timing, transferring the data for a threshold duration of time based at least in part on determining that the trigger condition is satisfied.

16. The apparatus of claim 15, wherein the controller is further configured to cause the apparatus to:
determine that the value of the counter is greater than a threshold value, wherein the transfer of the data is delayed based at least in part on the value of the counter being greater than the threshold value.

17. The apparatus of claim 12, wherein the controller is further configured to cause the apparatus to:
transfer the logical-to-physical address mapping to the volatile memory device based at least in part on receiving an access command to access the non-volatile memory device; and
increment the value of the counter based at least in part on transferring the logical-to-physical address mapping to the volatile memory device.

18. The apparatus of claim 12, wherein the controller is configured to cause the apparatus to transfer the data by being configured to cause the apparatus to:
read the data from the first partition; and
write the data to the second partition.

19. The apparatus of claim 12, wherein the multiple-level memory cells comprise:
multi-level memory cells configured to store two bits of information;
tri-level memory cells configured to store three bits of information; or
quad-level memory cells configured to store four bits of information.

20. A method, comprising:
comparing a first value of a first counter for a set of logical addresses to a first threshold value, wherein the set of logical addresses is included in a logical-to-physical address mapping, and wherein the first counter configured to indicate a quantity of times the set of logical addresses has been read from a non-volatile memory device and written to a volatile memory device;
comparing the first value of the first counter to a second threshold value that is based at least in part on a second value of a second counter for the set of logical addresses, the second counter configured to indicate a quantity of times the set of logical addresses of the logical-to-physical address mapping has been written to the non-volatile memory device from the volatile memory device;
selecting, from a plurality of types of data movement operations supported by the non-volatile memory device, a first type of data movement operation based at least in part on comparing the first value to the first threshold value and the second threshold value; and
performing the first type of data movement operation for data associated with the set of logical addresses based at least in part on the selection.

21. The method of claim 20, wherein the set of logical addresses comprises a quantity of non-sequentially indexed logical addresses, the method further comprising:
comparing the quantity of non-sequentially indexed logical addresses to a threshold quantity, wherein the first type of data movement operation is selected based at least in part on comparing the quantity of non-sequentially indexed logical addresses to the threshold quantity.

22. The method of claim 20, wherein transferring the data comprises:
reading the data from memory cells that have non-sequentially indexed physical addresses; and
writing the data to memory cells that have sequentially indexed physical addresses.

23. The method of claim 22, further comprising:
determining that the first value of the first counter is greater than the first threshold value, wherein the first type of data movement operation is selected based at least in part on the first value of the first counter being greater than the first threshold value.

24. A method, comprising:
determining a value of a counter that is configured to indicate a quantity of times a logical-to-physical address mapping for a first partition of a non-volatile memory device has been read from the non-volatile memory device and written to a volatile memory device, the first partition comprising a write booster buffer configured to store information in single-level memory cells;
determining, based at least in part on the value of the counter, a timing for transferring data from the first partition to a second partition of the non-volatile memory device that comprises multiple-level memory cells; and
transferring the data from the first partition to the second partition based at least in part on the timing.

25. The method of claim 24, further comprising:
determining that a trigger condition for transferring the data from the first partition to the second partition is satisfied; and
delaying, based at least in part on the timing, transferring the data for a threshold duration of time based at least in part on determining that the trigger condition is satisfied.

* * * * *